US009141218B2

(12) United States Patent
Kim

(10) Patent No.: US 9,141,218 B2
(45) Date of Patent: Sep. 22, 2015

(54) ELECTRONIC DEVICE AND CONTROL METHOD THEREOF

(71) Applicant: LG ELECTRONICS INC., Seoul (KR)

(72) Inventor: Tae Hun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/321,464

(22) Filed: Jul. 1, 2014

(65) Prior Publication Data

US 2014/0313152 A1    Oct. 23, 2014

Related U.S. Application Data

(63) Continuation of application No. 13/938,094, filed on Jul. 9, 2013, now Pat. No. 8,797,293, which is a continuation of application No. 13/218,351, filed on Aug. 25, 2011, now Pat. No. 8,558,814, which is a continuation of application No. 12/016,990, filed on Jan. 18, 2008, now Pat. No. 8,031,184.

(30) Foreign Application Priority Data

Jan. 19, 2007  (KR) .................. 10-2007-0006336
Jan. 19, 2007  (KR) .................. 10-2007-0006343

(51) Int. Cl.
G06F 3/045    (2006.01)
G06F 3/041    (2006.01)
G06F 3/0488   (2013.01)

(52) U.S. Cl.
CPC ............ *G06F 3/041* (2013.01); *G06F 3/04883* (2013.01); *G06F 3/04886* (2013.01)

(58) Field of Classification Search
CPC ....... G06F 3/041; G06F 3/042; G06F 3/0421; G06F 3/044; G06F 3/0488; G06F 3/04883; G06F 3/04886
USPC .................................... 345/173–179
See application file for complete search history.

(56) References Cited

U.S. PATENT DOCUMENTS

| 7,158,678 | B2  | 1/2007  | Nagel et al. |
| 7,580,029 | B2  | 8/2009  | Liu et al. |
| 8,031,184 | B2* | 10/2011 | Kim .............................. 345/174 |
| 8,558,814 | B2* | 10/2013 | Kim .............................. 345/174 |
| 8,797,293 | B2* | 8/2014  | Kim .............................. 345/174 |
| 2003/0016873 | A1 | 1/2003 | Nagel et al. |
| 2004/0263487 | A1 | 12/2004 | Mayoraz et al. |
| 2005/0219226 | A1 | 10/2005 | Liu et al. |

FOREIGN PATENT DOCUMENTS

| JP | 2000-105662     | 4/2000  |
| KR | 10-2001-0096061 | 11/2001 |
| KR | 10-2006-0028787 | 4/2006  |

OTHER PUBLICATIONS

Korean Intellectual Property Office Application Serial No. 10-2007-0006343, Notice of Allowance dated Nov. 8, 2013, 2 pages.

* cited by examiner

*Primary Examiner* — Vijay Shankar
(74) *Attorney, Agent, or Firm* — Lee, Hong, Degerman, Kang & Waimey

(57) ABSTRACT

An electronic device and a method for inputting information through touch input device of an electronic device is provided. The method inputs information including at least one of symbols and characters through touching of a screen displayed on the touch input device, and executes a specific application capable of processing the input information.

28 Claims, 30 Drawing Sheets

(a)

(b)

S600

S610

100

ELECTRONIC DEVICE AND CONTROL METHOD THEREOF

CROSS-REFERENCE TO RELATED APPLICATIONS

This application is a continuation of U.S. patent application Ser. No. 13/938,094, filed on Jul. 9, 2013, now U.S. Pat. No. 8,797,293, which is a continuation of U.S. patent application Ser. No. 13/218,351, filed on Aug. 25, 2011, now U.S. Pat. No. 8,558,814, which is a continuation of U.S. patent application Ser. No. 12/016,990, filed on Jan. 18, 2008, now U.S. Pat. No. 8,031,184, which claims the benefit of earlier filing date and right of priority to Korean Patent Application Nos. 10-2007-0006336 and 10-2007-0006343, filed on Jan. 19, 2007, the contents of which are all hereby incorporated by reference herein in their entirety.

FIELD OF THE INVENTION

The present invention relates to a method of inputting information through a electronic touch input device.

DESCRIPTION OF THE RELATED ART

Generally, an electronic device equipped with a touch screen has a background screen where no icon is displayed and touching on the background does nothing to the device and no information is input.

An application icon is linked to a specific application to provide a shortcut for executing the linked specific application upon touching the icon. The background of the touch screen usually displays a wallpaper image selected by the user or provides instant information, such as a schedule or a calendar, which is checked often.

Generally, there are two approaches to execute a desired application using the electronic device having the touch screen: the first is to search menu list to select a menu item linked to the desired application and the second is to touch an application icon linked to the desired application.

The first approach may be inconvenient for the user because the user may need to scroll all the way down to search the menu list in order to find the menu item linked to the desired application. The second approach may not be practical because it may not be possible to display all applications on a limited area of the display screen by linking them to the application icons since there are numerous applications provided by the electronic device.

This problem is more relevant to a general mobile terminal having a small sized screen. Therefore, manipulation of the general mobile terminal having a touch screen requires a number of steps to execute the desired application because the user needs to search through the menu list, for example, when inputting information such as a memo. Further, the general electronic device having the touch screen lacks the capability of utilizing unique features of the touch screen by touching the background of the touch screen where no application icon is displayed.

SUMMARY OF THE INVENTION

In one general aspect, a method for inputting information through a touch input device of an electronic device includes inputting information including at least one of symbols and characters by touching a screen displayed on the touch input device and executing a specific application capable of processing the input information. The method then executes a specific application capable of processing the input information.

Preferably, the input information is displayed on the screen in real time. The method may further include displaying the input information in real time in a window displayed on a portion of the screen, wherein the window is associated with the executed application. Preferably, the information is input through an area of the screen where no application icon is displayed.

In the method, the specific application is one of a memo application for storing the input information as a memo, a transmission application for transmitting a message including the input information, a scheduler application for storing the input information as a schedule, a search application for utilizing the input information as a search term, and an application related to a call function.

In the method, the input information is either converted into a symbol or a character through a recognition algorithm or processed as an image. If the specific application is an application related to a call function, the method may also include recognizing the input information as a phone number, wherein the input information includes a number.

Preferably, the information is input during an idle mode of the electronic device. Alternatively, the information is input while another application is being executed. Preferably, the other application is an application for reproducing a file. More preferably, the file is at least one of an image file, a text file, a moving picture file, and an audio file.

In another aspect, a method for inputting information through a touch input device of an electronic device includes reproducing a file, inputting information including at least one of symbols and characters by sensory touching of a screen displayed on the touch input device while the file is being reproduced, and storing the input information in connection with the reproduced file.

In the method, storing the input information includes one of appending input information to the reproduced file and storing the input information in a separate file linked to the reproduced file. Storing the input information may include storing a reproducing period or a reproducing section of the reproduced file with the input information. The method may further include displaying the input information when the reproducing period or reproducing section of the reproduced file is reproduced after the input information is stored. Preferably, the file is one of an image file, a text file, a moving picture file, and an audio file.

In another aspect, an electronic device includes a touch input module for receiving an input including information, a memory for storing at least one application, and a controller for displaying a screen on the touch input module, receiving the information including at least one of symbols and characters when the screen is touched and executing a specific application stored at the memory, the specific application capable of processing the input information.

In yet another aspect, an electronic device includes a touch input module for receiving an input including information, a memory for storing at least one file to be reproduced and at least one application for reproducing the at least one file, and a controller for displaying a screen on the touch input module, receiving the information including at least one of symbols and characters when the screen is touched while reproducing the stored at least one file and storing the received information in connection with the reproduced file.

In yet another aspect, a method for executing an application using an electronic device equipped with a sensory touch input module includes touching an area of a screen displayed by the sensory touch input module where no application icon representing a predetermined application is displayed and executing a specific application in response to the touching.

In the method a type of the specific application may be set by a user. The specific application may be set such that the specific application is executed in a specific time zone. Preferably, the specific application varies when the specific time zone varies.

In the method, the screen displays an indicator representing the specific application in the area of the screen where no application icon is displayed. Preferably, the indicator includes at least one of a text, an icon, an image, and the screen.

In the method, the specific application may be executed when the area of the screen is touched once or N times within a predetermined time, wherein N is an integer larger than 1 and can be set or changed. The type of the specific application may vary depending on a number times the area where no application icon is displayed is touched within a predetermined time and the type of the specific application corresponding to the number of times the area is touched can be set or changed.

Alternatively, the specific application is executed when any one point of the area where no application icon is displayed is touched or N number of points are concurrently touched, wherein N is an integer larger than 1 and can be set or changed. The type of the specific application may also vary based on a number of concurrent touching points of the area where no application icon is displayed and the type of the specific application corresponding to the number of concurrent touching points can be set or changed.

In the method, the screen may be divided into a plurality of areas and the specific application is linked in such a manner that different applications are linked to different divided areas. Preferably, a number of the divided areas and a type of the specific application linked to each of the divided areas can be set or changed.

In yet another aspect, an electronic device includes a touch input module, a memory for storing at least two different types of applications, and a controller for displaying a screen on the touch input module and executing a specific application selected from the at least two different types of the applications when an area displaying no application icon representing a predetermined application is touched on the screen.

BRIEF DESCRIPTION OF THE DRAWINGS

The above and other features and advantages of the present invention will become more apparent by describing in detail preferred embodiments thereof with reference to the attached drawings.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
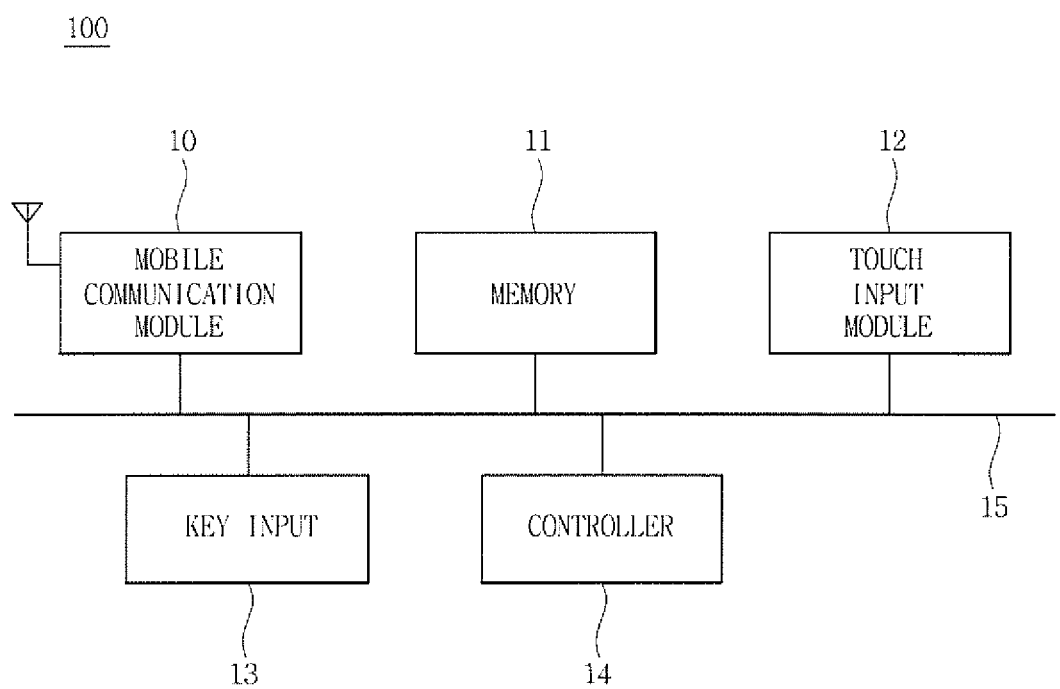
FIG. 1 is a block diagram illustrating an exemplary electronic device having a touch input module according to an embodiment of the present invention.
Figure 2:
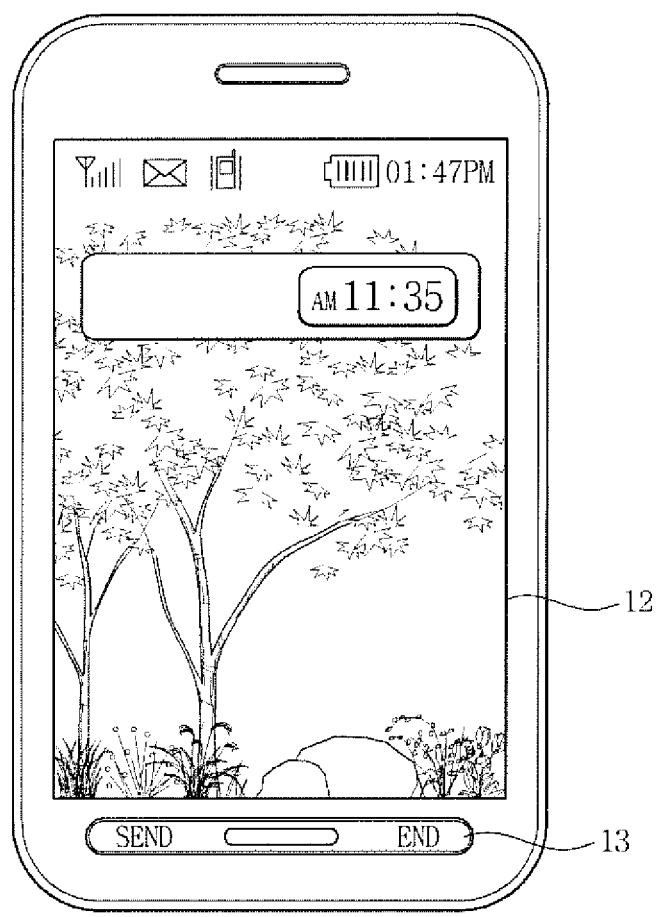
FIG. 2 is an exemplary top view of a mobile terminal according to an embodiment of the present invention.

FIG. 1 illustrates a block diagram of an electronic device 100 of a first embodiment of the present invention. The electronic device 100 may be implemented as various types of electronic devices having a touch screen such as a computer, a Personal Digital Assistance (PDA), or a mobile communication terminal Hereinafter, the mobile terminal with a communication function will be mainly described as an example of the electronic device 100.

The electronic device 100 comprises a mobile communication module 10, a memory 11, a touch input module 12, a key input 13, and a controller 14. These elements are connected to each other through a bus 15.

The communication module 10 is for transmitting and receiving data through a mobile communications network. For example, the electronic device 100 may transmit and receive a message or connect with other devices through the communication module 10.

The memory 11 stores programs for controlling general operations of the electronic device 100, and further stores various data input, output and processed during the general operations of the electronic device 100 under control of the controller 14. In addition, the memory 11 may store one or more different types of applications. The applications may include applications to perform various functions of the electronic device 100 and externally downloaded applications.

For example, the applications may include an application for editing a memo or a note, an application for transmitting and receiving Short Message Service (SMS) or Multimedia Messaging System (MMS) messages, a scheduler application for managing a schedule, an application for operating a camera, web browser applications for connecting to a mobile internet, an application for connecting a call through the communication module 10, applications for games, and applications for searching data stored at the memory 11.

Further, the memory 11 may store a symbol or character recognition algorithm. A touch trajectory input from the touch input module 12 may be converted into a predetermined symbol or a character through the symbol or character recognition algorithm.

The touch input module 12 displays various types of information or an operation status of the electronic device 100 according to a control signal from the controller 14. The touch input module 12 is also used for inputting various types of information or commands via a sensory touching by a user through a touch sensing technique.

The key input 13 includes one or more keys assigned to predefined functions including various number keys or directional keys to input various information and commands from the user. The controller 14 controls the above described elements and the general operations of the electronic device 100.

In addition to the above described elements, the electronic device 100 may further include at least one of a broadcast receiver module, a communication module for communicating through a wireless internet, a camera module, a vibration module for generating vibration, and various types of sensors.

Examples of information display methods using the above described electronic device 100 will now be described. However, the information display method described herein may be performed by using alternative methods. A method for inputting information using the electronic device 100 will be described in more detail with reference to FIGS. 1 to 4.

Figure 4:
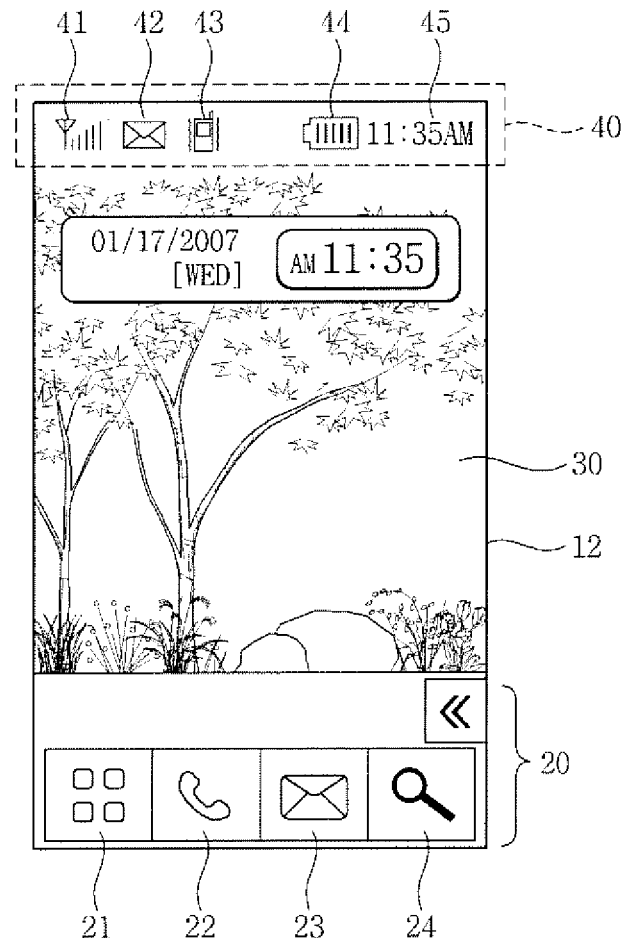
FIG. 4 is an exemplary view of a screen for inputting information according to an embodiment of the present invention.

Referring to FIG. 4, the touch input module 12 displays a screen under control of the controller 14. The screen may be divided into two areas: a first area 20 in which application icons are displayed and a second area 30, referred to as a background hereinafter, in which no application icon is displayed.

For example, the first area 20 may display application icons, such as a menu icon 21, for selecting a menu list, a call icon 22 for executing a call connection, a message icon 23 for executing a message transmission/reception, and a magnification icon 24 for magnifying data, such as a text and an image, displayed on the screen as shown in FIG. 4.

The background 30 may include an indicator area 40 to inform a user of a current status of the electronic device 100. For example, the indicator area 40 may display at least one of an indicator 41 for signal reception level, an indicator 42 for a message reception, an indicator 43 for vibration mode activation, an indicator 44 for remained battery power level, and a clock 45.

Figure 3:
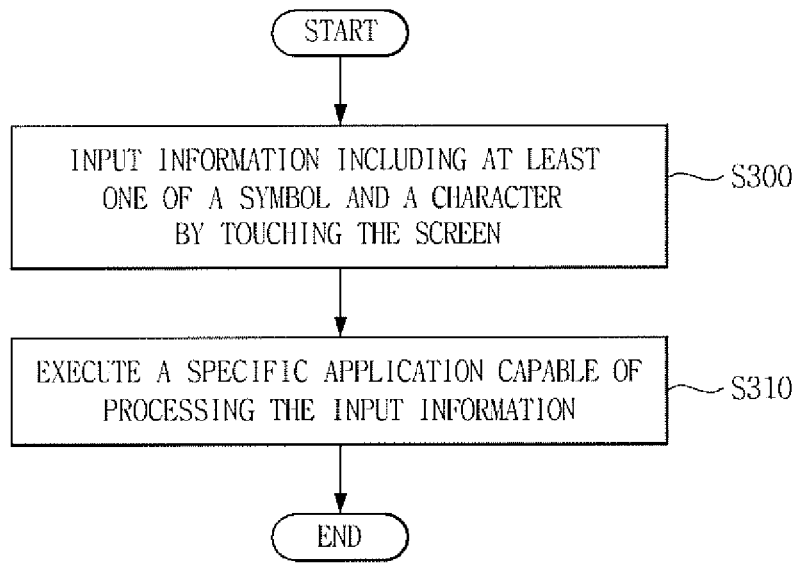
FIG. 3 is a flow chart illustrating a method for inputting information using the electronic device with the touch input module according to an embodiment of the present invention.

As shown in FIG. 3, the screen is first touched at step S300 to input information including at least one of a symbol and a character. The character may include a number. For example, the user may use a finger or a stylus pen to input information through the touch input module 12 by hand writing the information on the screen.

Figure 5:
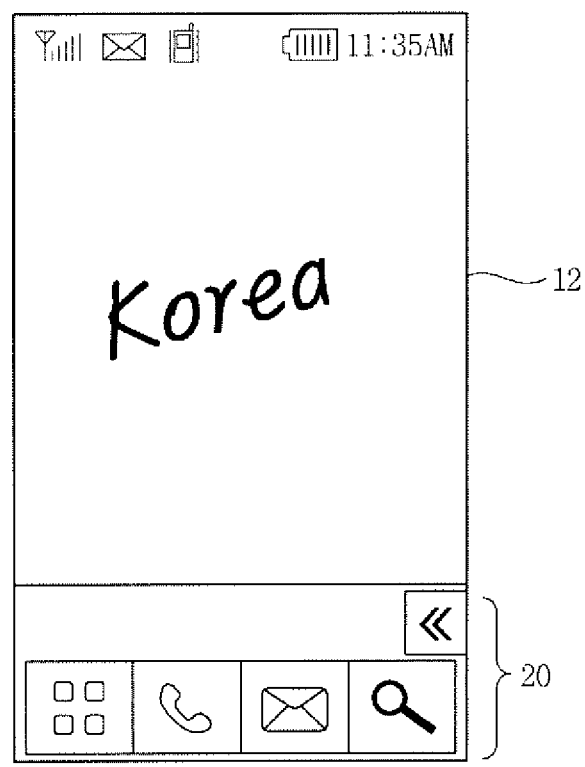
FIG. 5 is an exemplary view of a touch screen for inputting information through a background of the screen according to an embodiment of the present invention.

FIG. 5 is an exemplary view of a screen to input information through the screen. As shown in FIG. 5, a string of characters "KOREA" is written on the screen by the finger of the user.

As also shown in FIG. 3, the information may be input at step S300, through the entire area of the screen including the first area 20 and the second area 30, or may be input through any other area of the background, except the first area 20. The input information may be displayed on the screen in real-time under control of the controller 14. For example, the touch trajectory of the information hand written by using the finger or the stylus pen may be displayed on the screen in a specific color which is distinguishable from the screen under control of the controller 14. The controller 14 executes a specific application at step S310 capable of processing the input information.

In case when the input information is numbers, the specific application may be applications related to a call function, such as storing the input numbers as a phone number in a phone-book or placing a call to the recognized phone number. The application related to the call function may further provide a message transmission and reception function. Thus, if the user inputs numbers to the touch input module 12, the controller 14 may recognize the input numbers as a phone number to execute the application related to the call function.

Further, in case when the input information corresponds to symbols or characters, the specific application may be any one of applications for transmitting a message including the input information, search applications for searching the memory 11 or the Internet using the input information as a search term, and a scheduler application for planning a schedule using the input information.

The specific application executed at step S310, shown in FIG. 3, may be set or changed by the user. The user may set the specific application to be executed among the applications capable of processing the input information and change the set application to another application. The timing of executing the specific application may vary.

The controller 14 may execute the specific application at the time when a signal input from the touch input module 12 is recognized as a symbol or a character. For example, when the user inputs the characters "KOREA" by hand writing on the screen of the touch input module 12, the controller 14 may execute the specific application when the first character "K" is inputted.

Alternatively, the controller 14 may execute the specific application at the time when no signal is input from the touch input module 12 for a predetermined reference period after recognizing a symbol or a character input from the touch input module 12. For example, the controller 14 may execute the specific application when the user does not input any more information during the predetermined reference period after inputting characters "KOREA" by hand writing on the screen of the touch input module 12, rather than when the first character "K" is inputted as described above.

Alternatively, the controller 14 may execute the specific application at the time when a signal input from the touch input module 12 is recognized as a meaningful word or sign. For example, when the user inputs characters "KOREA IS" by hand writing on the screen of the touch input module 12, the controller 14 may execute the specific application when it recognizes the input characters "KOREA" as a meaningful word. Therefore, the user may input the characters "IS" on the screen after the specific application is executed.

In the above examples, the entire screen does not need to be updated upon execution of the specific application. For example, the controller 14 may execute the specific application without updating the entire screen when the user inputs the information on the screen. In this case, the controller 14 may not display any screen related to the executed specific application. Alternatively, the controller 14 may display a popup window related to the executed application on the screen.

Figure 6:
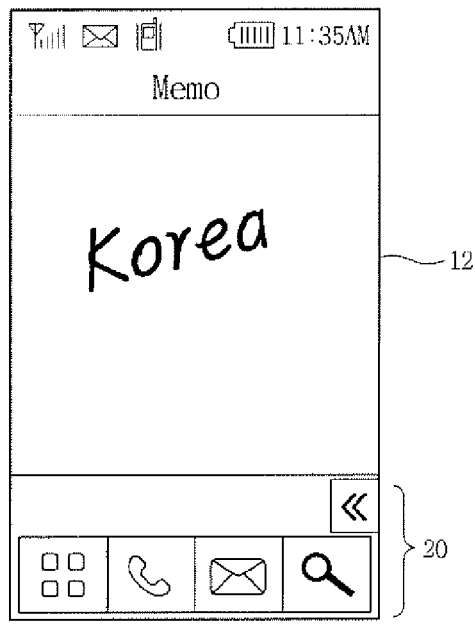
FIGS. 6(a) and 6(b) are exemplary views of screens of the mobile terminal in which a memo application is being executed according to an embodiment of the present invention.
Figure 6:
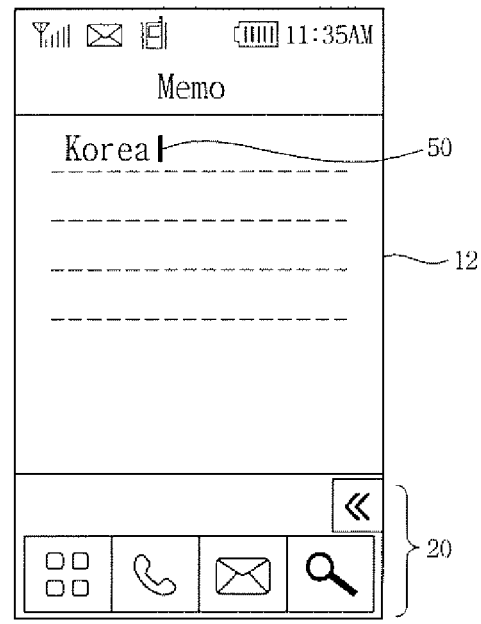

FIGS. 6(*a*) and 6(*b*) are exemplary views of screens in which a memo application is being executed. The controller 14 may convert the touch input information into symbols or characters using the symbol or character recognition algorithm to display the converted symbols or characters at a specific area of the screen, or may process the input information as an image. The controller 14 may further control the executed application to display the input information in real time.

For example, the screen displays a touch trajectory of handwriting in FIG. 6(*a*) without converting it into signs or characters, thereby processing it as an image. In this example, the touch trajectory may be converted into symbols or characters by the controller 14 while the touch trajectory is being displayed.

Alternatively, as shown in FIG. 6(*b*), the screen displays characters into which the touch trajectory is converted using the symbol or character recognition algorithm. In FIG. 6(*b*), a reference numeral 50 represents a cursor.

Figure 7:
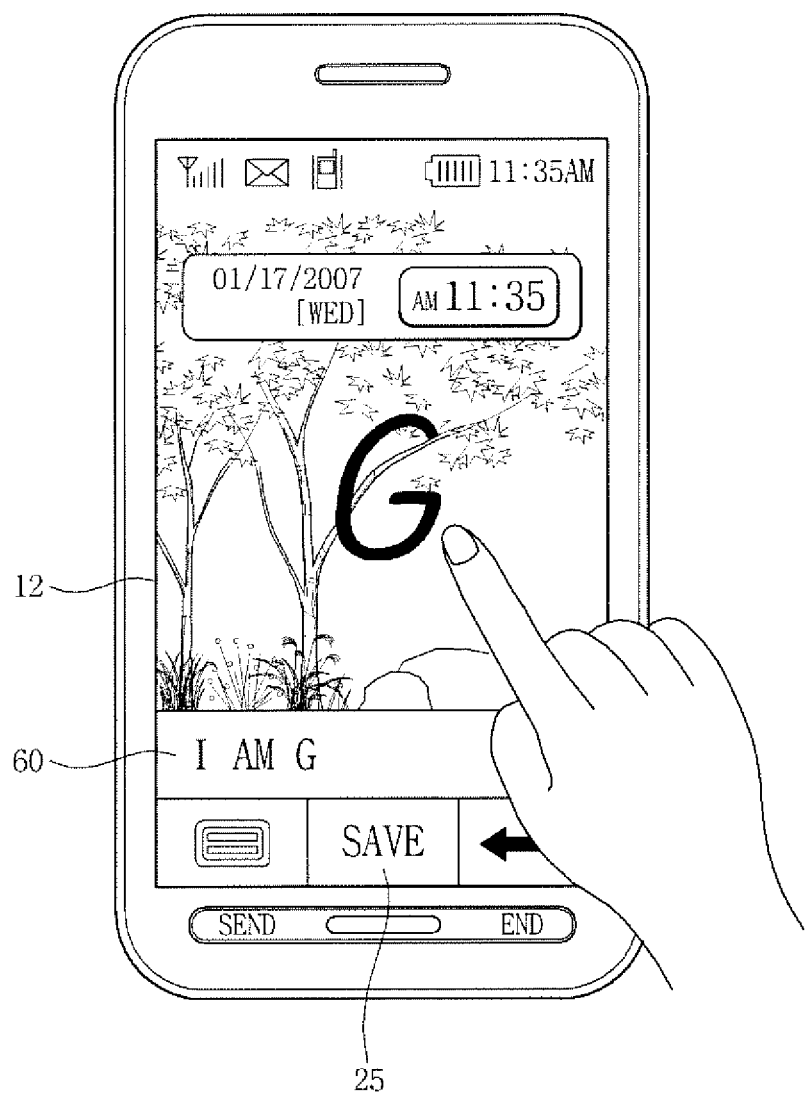
FIGS. 7 to 9 are exemplary views of screens for inputting information through sensory touching inputs according to an embodiment of the present invention.
Figure 8:
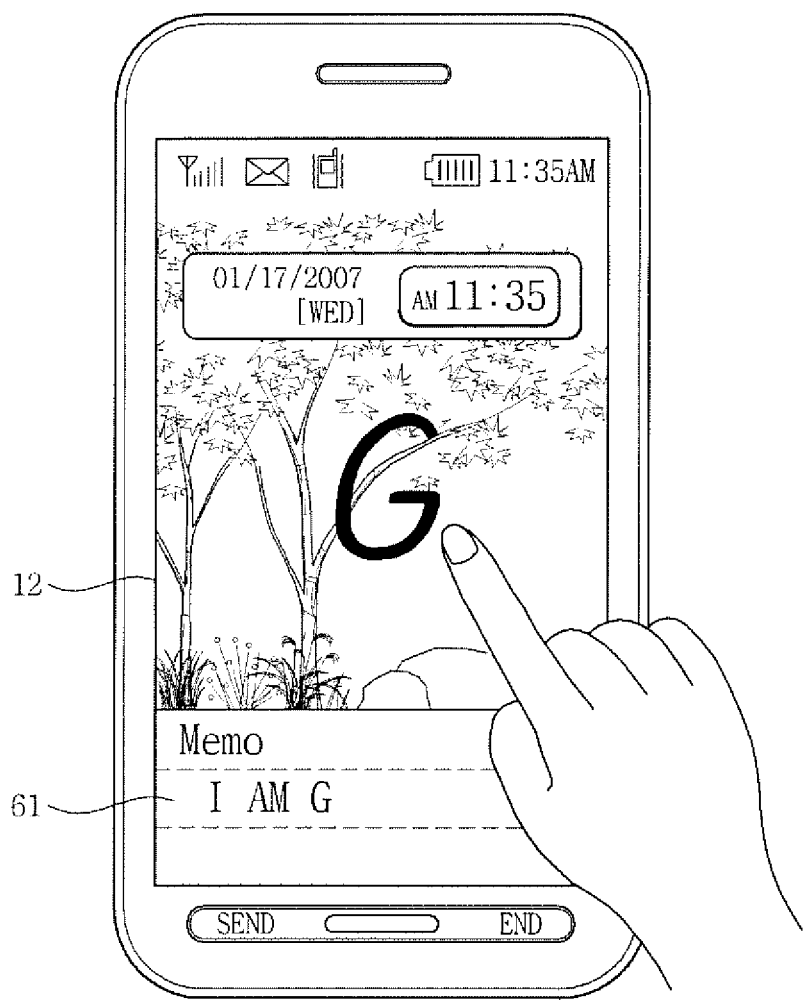
Figure 9:
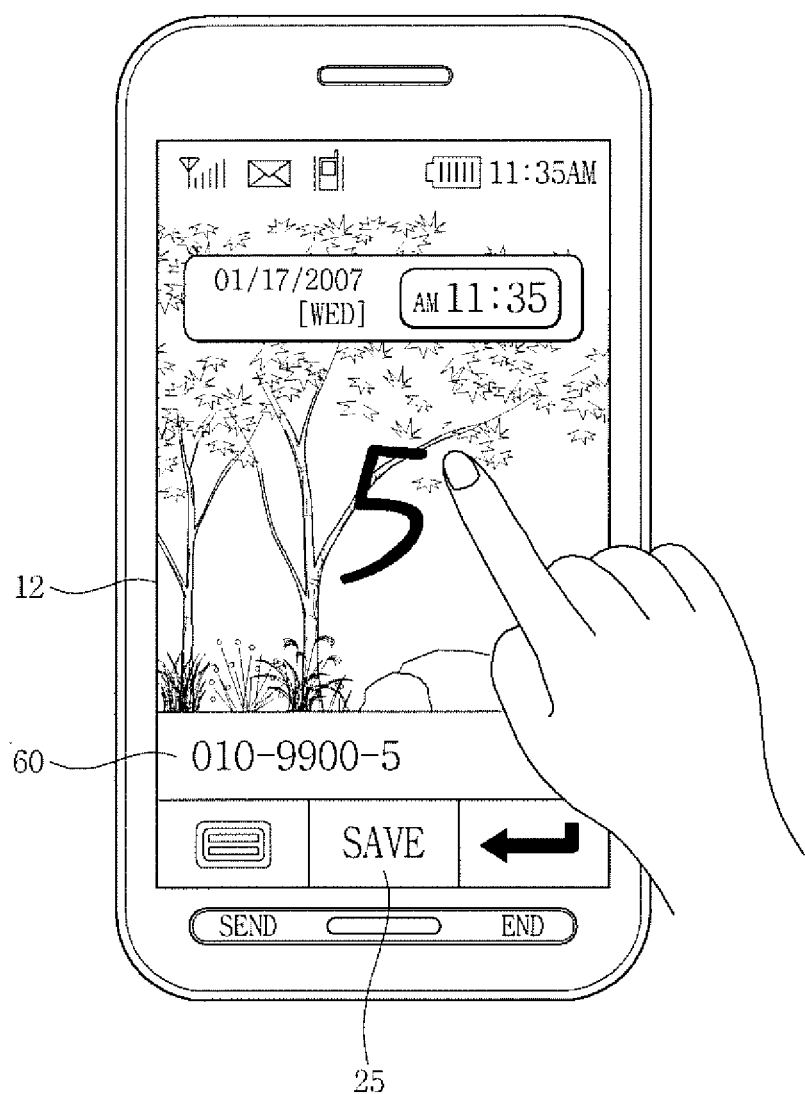

FIGS. 7 to 9 are exemplary views of screens displaying characters into which touch input information is converted. For example, referring to FIG. 7, the screen may provide a display area 60 to display the characters into which the touch input according to handwriting on the screen is recognized and converted. In this case, when the "memo" application is executed in response to the touch input through the screen, the controller 14 may further provide buttons to allow the user control the processing of the input information. For example, as shown in FIG. 7, there is provided a "SAVE" button 25 and the user may store the input information as a memo upon touching the button 25 without proceeding into a different screen.

For another example, in FIG. 8, the screen displays a text "Memo" at a display area 61 to inform the user of an application currently being executed. Therefore, the user may instantly notice that the application currently being executed is the "Memo" application upon looking at the displayed text "Memo".

For still another example, referring to FIG. 9, if an application for performing a phonebook function is executed when information including a number is inputted by the user, the user may store the input information in a phonebook by touching the "SAVE" button 25. Alternatively, the screen may be changed to a screen related to the phonebook application for storing additional information input in the phonebook upon touching of the "SAVE" button 25.

Step S300 of FIG. 3 may be performed in various modes of the electronic device 100. Two examples are provided, specifically for an idle mode and an active mode.

The above described screen is generally referred to as a standby screen in the idle mode. That is, step S300 is performed when no specific application noticeable to the user is activated or executed. When the electronic device 100 is in the idle mode, the user may not become aware that any function is being performed by the electronic device 100. In fact, a power source is being applied to the electronic device 100 even during the idle mode.

For example, the mobile communication terminal continuously performs communications with a base station even though the user may not notice it. The idle mode refers to a state in which the electronic device 100 is operated unnoticeably.

A specific application is executed at step S300 in the active mode while another application is being executed. For example, while a music application for outputting music is running in the electronic device 100, the touch input module 12 may display a screen provided by the music application or a screen for the idle mode.

The screen for the music application may include the second area 30 in which no application icon is displayed. When information is input through the second area 30 by the user writing at step S300, a specific application capable of processing the input information is executed at step S310. For example, if the user wants to send a title of currently played music to a friend via SMS, the user may input the title of the music by handwriting on the screen, thereby directly proceeding into a screen for providing a SMS function.

Herein, the previously executed application may be continued or interrupted. As to the above example, the execution of the music application may be continued, thereby enabling the user to listen to the music after the screen for the SMS function is displayed. Alternatively, the music application may be interrupted upon proceeding into the screen for the SMS function. The active mode will be described in more detail later.

Figure 10:
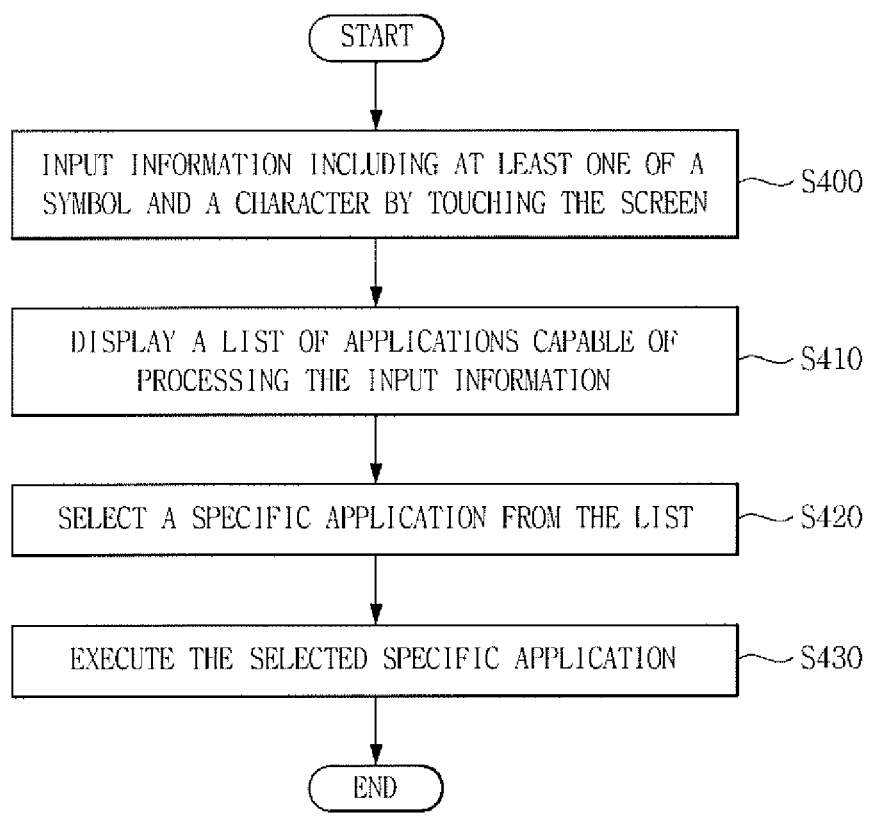
FIG. 10 is a flow chart illustrating another method for inputting information through the touch input module of the electronic device according to an embodiment of the present invention.

FIG. 10 is a flow chart illustrating another method for inputting information using the electronic device with the touch input module. The controller 14 inputs information, including at least one of symbols and characters information, at step S400 upon touching a screen of the touch input module. Step S400 corresponds to the above described step S300.

Figure 11:
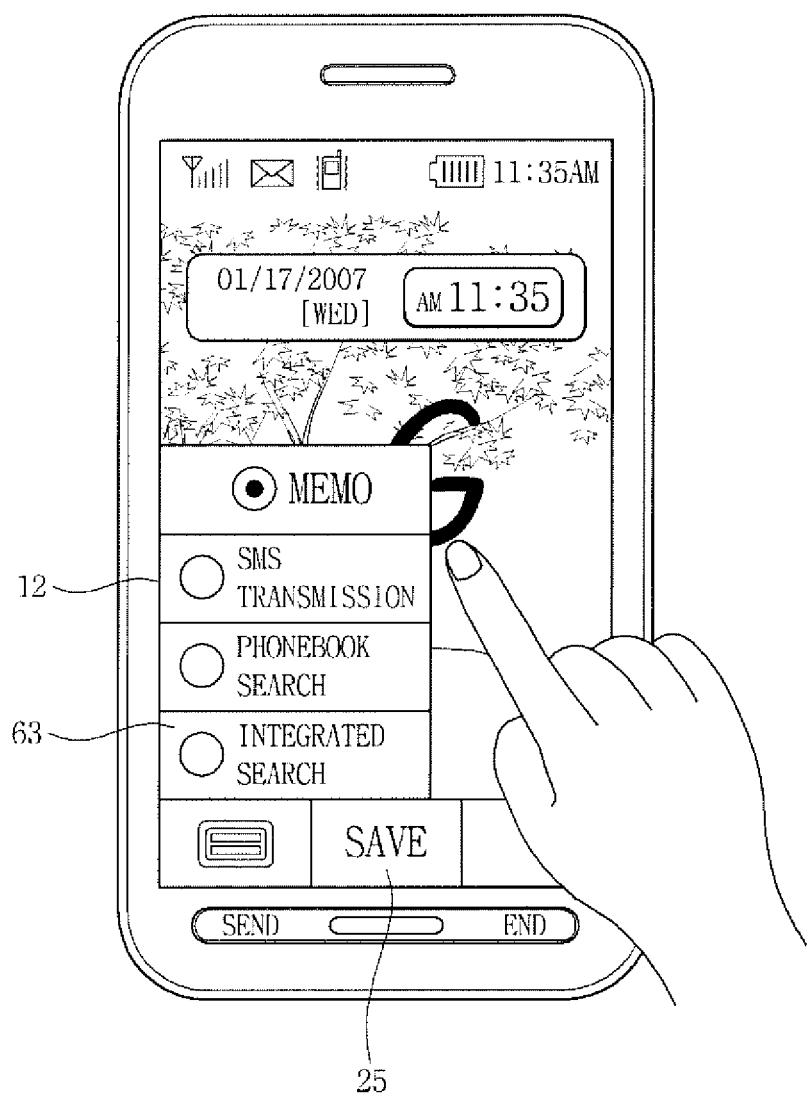
FIG. 11 is an exemplary view of a screen displaying a list of applications on the touch input module according to an embodiment of the present invention.

The controller 14 then displays a list of applications at step S410 capable of processing the input information of the step S400. FIG. 11 is an exemplary view of the screen displaying a list of applications on the touch input module. Referring to FIG. 11, the screen provides the list of the applications capable of processing the input information: the list including a "memo" application, an "SMS transmission" application, a "phonebook search" application, and an "integrated search" application.

The controller receives a selection signal at step S420 for selecting any one of the applications displayed in the list at step S410. For example, the "memo" application is selected in FIG. 11. The controller executes the application selected at step S420 at step S430. Step S430 corresponds to the above described step S310. The "memo" application will be executed in response to the selection shown in FIG. 11.

Figure 12:
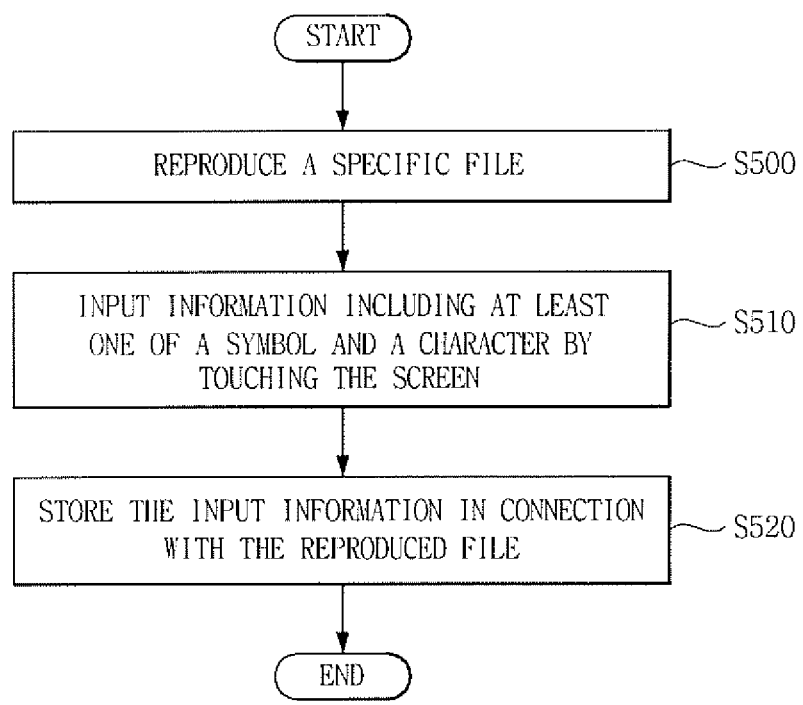
FIG. 12 is a flow chart illustrating yet another method for inputting information through the touch input module of the electronic device according to an embodiment of the present invention.

FIG. 12 is a flow chart illustrating yet another method for inputting information using the electronic device with the touch input module. A specific file is reproduced at step S500. The specific file may be an image file, a text file, a moving picture file, or an audio file.

Herein, it is assumed that an audio file with a file name "Yesterday.mp3" is reproduced. During reproduction of the audio file, the screen displayed at the touch input module 12 is touched for a period of time such that information including symbols or characters is input at step S510. Step S510 corresponds to the above described step S300.

Figure 13:
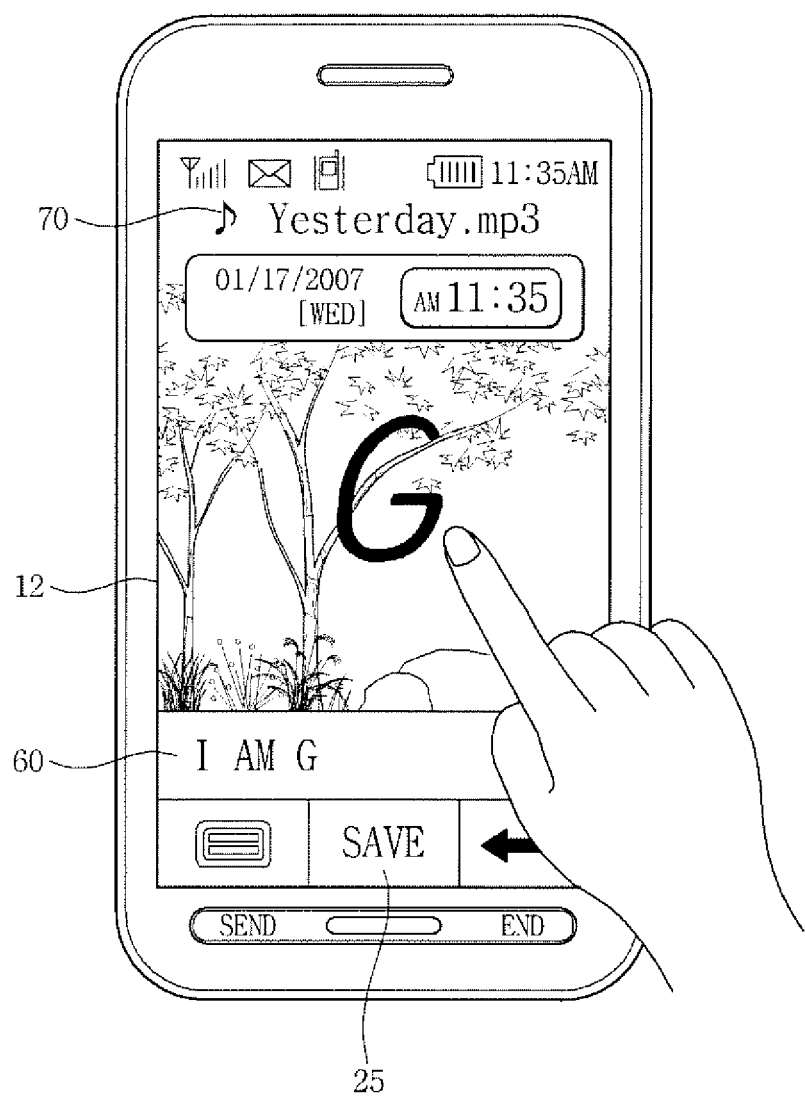
FIG. 13 is an exemplary view of a screen for inputting information during reproduction of a music file with the mobile terminal according to an embodiment of the present invention.

FIG. 13 is an exemplary view of the screen for inputting information during reproduction of music. For example, the user may input information on the screen by handwriting while listing to the music reproduced from the file "Yesterday.mp3" at step S500. Referring to FIG. 13, the screen displays a text of "Yesterday.mp3" at a defined area to enable the user to notice the name of the music currently playing. In FIG. 13, a screen for the music application is not displayed while the music is being reproduced.

The controller 14 may store the information input at step S510 at step S520 in connection with the music file being reproduced at step S500. In step S520, the input information may be converted and stored as a symbol or a character through the symbol and character recognition algorithm, or may be stored as an image.

Further, the input information may be stored in step S520 as appended to the reproduced music file or as a separate file linked to the produced music file. For example, as shown in FIG. 13, the user may append the touch input memo to the reproduced music file "Yesterday.mp3" or create a separate file and link the created file to the reproduced music file.

Information regarding the music file, such as a reproducing period or a reproducing section of the music file, may be stored at step S520 with the input information. For example, the user may take a memo for words corresponding to a specific reproducing section of the "Yesterday.mp3" music file. Then, the controller 14 may store the input memo with the reproducing period or the reproducing section of the "Yesterday.mp3" file. Afterwards, the stored memo may be displayed when the part of the music file corresponding to the reproducing period or the reproducing section stored with the memo is again reproduced.

Figure 14:
FIG. 14 is an exemplary view of a screen with input information displayed in the background of the screen according to an embodiment of the present invention.

FIG. 14 is an exemplary view of a screen in which input information is included as a part of a background. For example, the information input by handwriting is included in the background and displayed as if the input information is part of the background.

Figure 15:
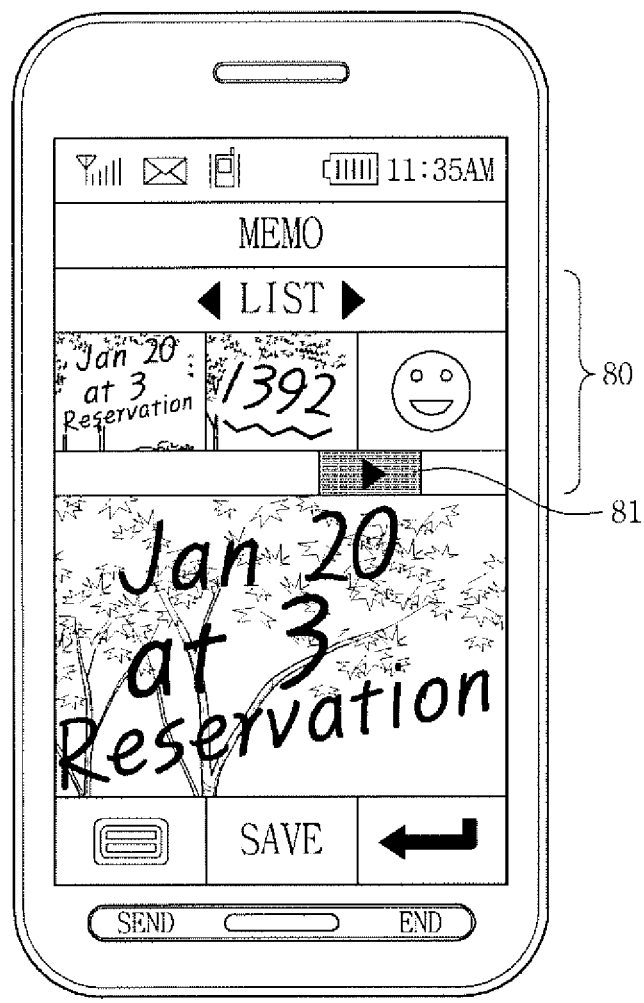
FIG. 15 is an exemplary view of a screen displaying a list of memos input and stored through the touch input module of the mobile terminal according to an embodiment of the present invention.

FIG. 15 is an exemplary view of a screen displaying a list of memos input and stored through the touch input module. For example, the list of the input memos is displayed at a specific area 80 of the screen, whereby the user may scroll the list of the memos using a scroll bar 81.

Figure 16:
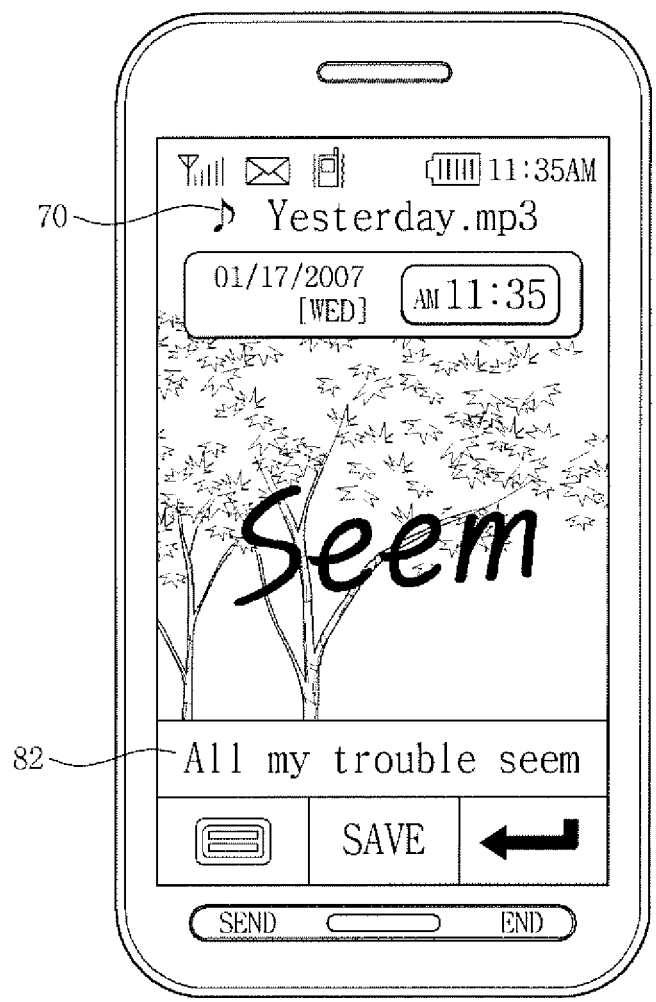
FIGS. 16 and 17 are exemplary views of screens displaying memos stored and linked to music files according to an embodiment of the present invention.
Figure 17:
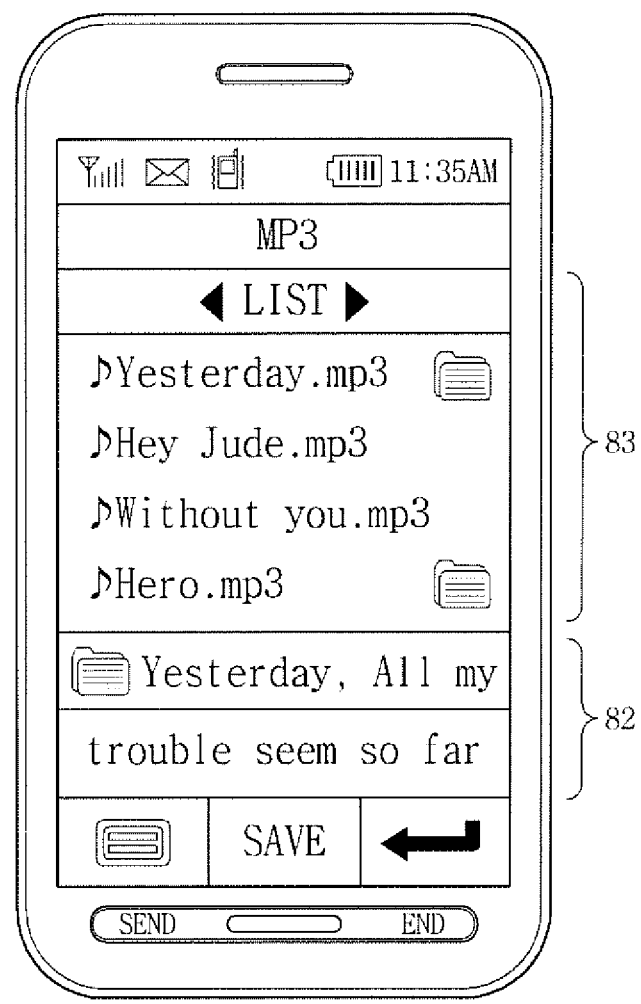

FIGS. 16 and 17 are exemplary views of screens displaying memos stored and linked to music files. For example, in FIG. 16, the user may input and store words of the music with the file name of "Yesterday.mp3" while listening to the music. The stored words may be displayed at a specific area 82 while a section of the file corresponding to the stored words is being reproduced. For another example, as shown in FIG. 17, a music file may be selected for reproduction from a list of music files 83. If the music file linked to the stored memo is selected, the stored memo may be displayed at a specific area 82.

Figure 18:
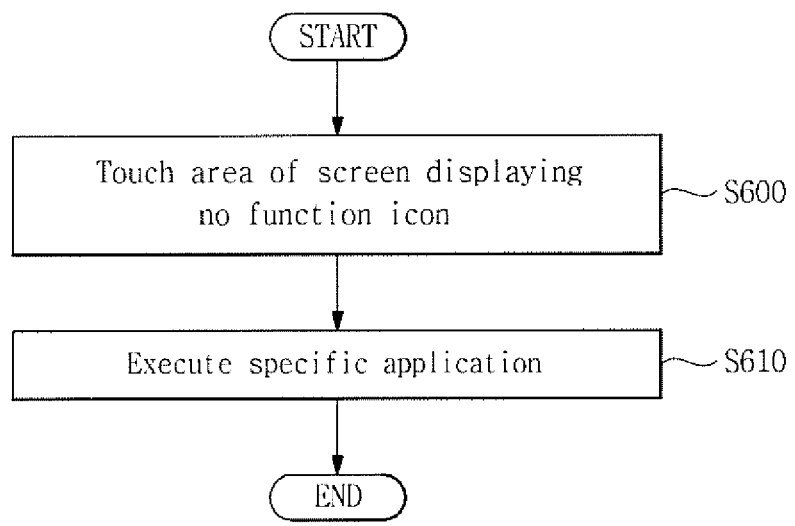
FIG. 18 is a flowchart illustrating another application execution method in an electronic device having a touch input module according to an embodiment of the present invention according to an embodiment of the present invention.
Figure 19:
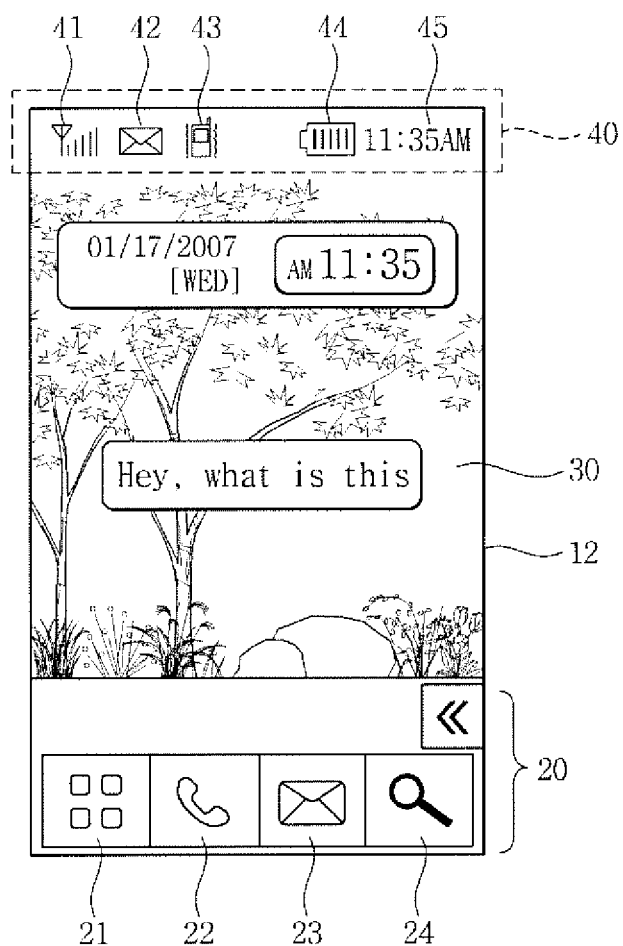
FIG. 19 is an exemplary view of a touch input module for applying another application execution method according to an embodiment of the present invention.

Another implementation of an application execution method using the electronic device 100 having a touch input module illustrated in FIG. 1 is described with reference to FIG. 18. With further reference to FIG. 19, a touch input module 12 displays a screen under control of a controller 14. The screen may be divided into two areas: a first area 20 in which application icons are displayed and a second area 30, referred to as a background hereinafter, in which no application icon is displayed as described in connection with FIG. 4.

Figure 20A:
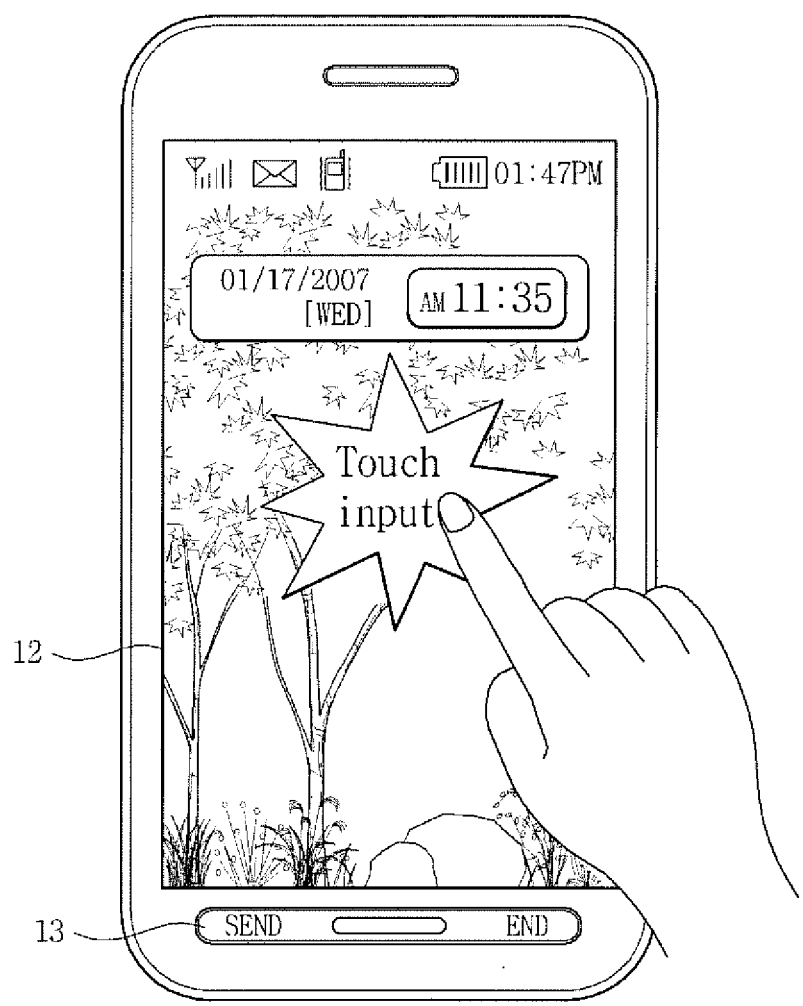
FIGS. 20A and 20B are exemplary views of a screen for implementing another application execution method according to an embodiment of the present invention.
Figure 20B:
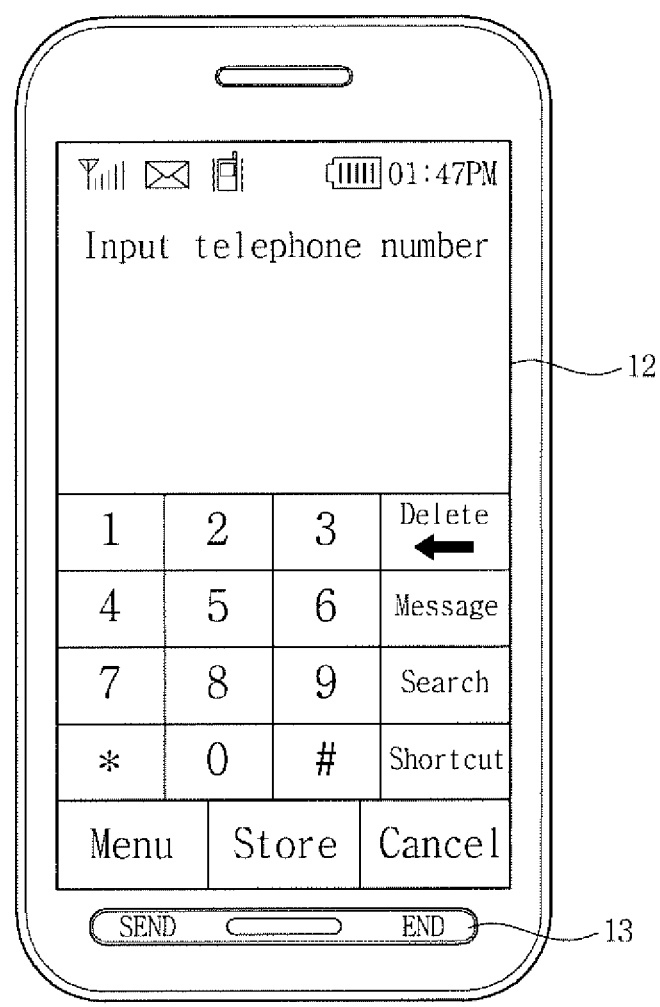

The background 30 of the screen displayed when the touch input module 12 is touched (S600). For example, as shown in FIG. 20A, a user touches any point of the background 30 with a finger or a stylus pen (S600). The controller 14 executes a specific application in response to the touch input (S610). As shown in FIG. 20B, the controller 14 then executes an application providing a call connection function.

Figure 21:
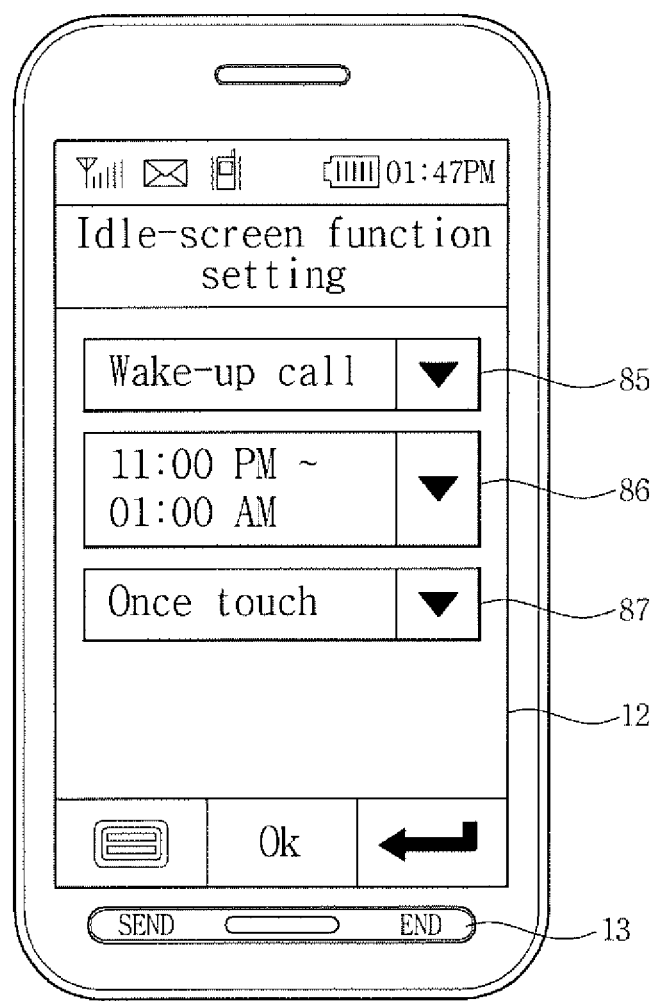
FIG. 21 is an exemplary view of a screen for setting a specific application according to an embodiment of the present invention.

The specific application executed at step S610 may be set or changed by a user. FIG. 21 illustrates an example of a screen for setting the specific application. For example, an application displaying a menu "idle-screen function setting" and providing an alarm function of "wake-up call" is set as a specific application for execution at step S610. Also, if a set button 85 positioned at a side of "wake-up call" is selected in FIG. 21, a list of a specific applications that can be executed at step S610 may be displayed. A user may select a desired specific application from the displayed list. The specific application executed at step S610 may be set in various ways.

The specific application may be set such that the specific application is executed in a specific time zone. The electronic device 100 may provide a menu for setting the specific application according to the specific time zone.

For example, in FIG. 21, if a user touches the background 30 in a time zone "11:00 PM to 01:00 AM", execution of the application "wake-up call" is set. For example, in FIG. 21, if a time setting button 86 positioned at a side of "11:00 PM to 01:00 AM" is selected, a window or screen is displayed for setting a specific time zone at which the specific application is executed.

The controller 14 controls the specific application executed at step S610 according to a specific time zone. For example, an application for web search may be set in a morning time zone, an application providing a call connection function may be set in an afternoon time zone, and an application providing an MP3 play function may be set in a night time zone.

By setting the specific application in a specific time zone as described above, a user may easily execute an application frequently used in the specific time zone. For example, a user may execute the "wake-up call" application with only a motion of touching the background in the time zone (11:00 PM to 01:00 AM) in which he/she goes to bed and set a time at which he/she desires to get up the next day as illustrated in FIG. 21.

The application may be set such that step S610 is executed when the background 30 is touched once or touched 'N' times within a predetermined time. 'N' is an integer larger than 1. The value of 'N' for executing step S610 can be set or changed by a user.

For example, the application may be set such that the background 30 must be touched once or twice by the user to execute the step S610. In FIG. 21, "once touch" is set. The electronic device 100 may provide a menu for the setting execution of an application according to the number of times the background 30 is touched. If the user presses a number-of-times setting button 87 in FIG. 21, the value of 'N' for execution of step S610 can be set or changed through a display window.

The controller 14 controls the specific application executed at step S610 according to the number of times the background 30 is touched within a predetermined time. The specific application executed according to the number of times the background 30 is touched can be set and changed. For example, a "message" application is executed when "once touch" is set, a "call connection" application is executed when "twice touch" is set, and a "camera" application is executed when "three-time touch" is set.

The application may be set such that step S610 is executed when any one point on the background 30 is touched or 'N' number of points are concurrently touched. 'N' is an integer larger than 1. The number of touch points for executing step S610 can be set or changed by a user. The electronic device 100 may provide a menu for setting the execution of an application according to the number of points touched.

For example, a selection that any one point of the background 30 should be touched or two different points should be concurrently touched to execute step S610 may be provided. The controller 14 controls the specific application executed at step S610 according to the number of points touched on the background 30.

The specific application corresponding to the number of points touched can be set or changed. For example, a "message" application may be executed when one point is touched and a "call connection" application may be executed when two different points are concurrently touched.

The controller 14 controls the application icon representing the specific application such that it is displayed in the background 30. A user may notice whether any application is set in the background 30 upon seeing the application icon.

Figure 22A:
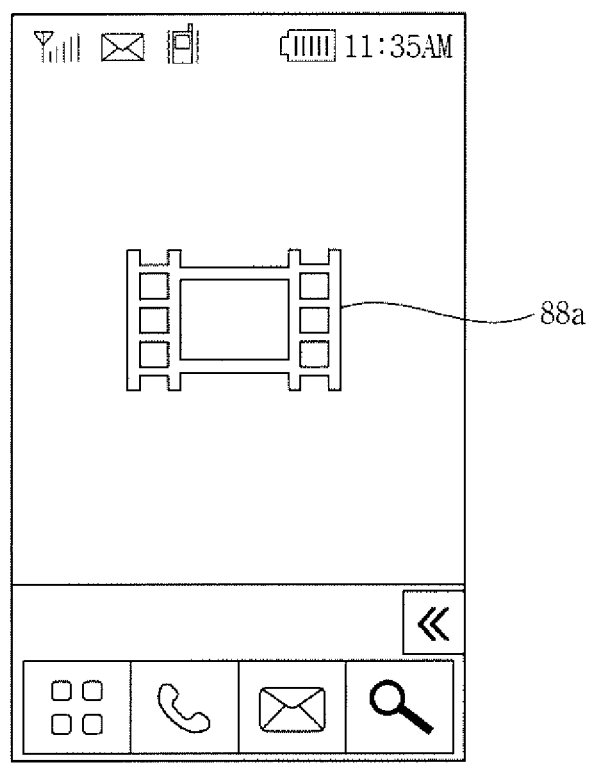
FIG. 22A to 22C are exemplary views of different types of application icons according to an embodiment of the present invention.
Figure 22B:
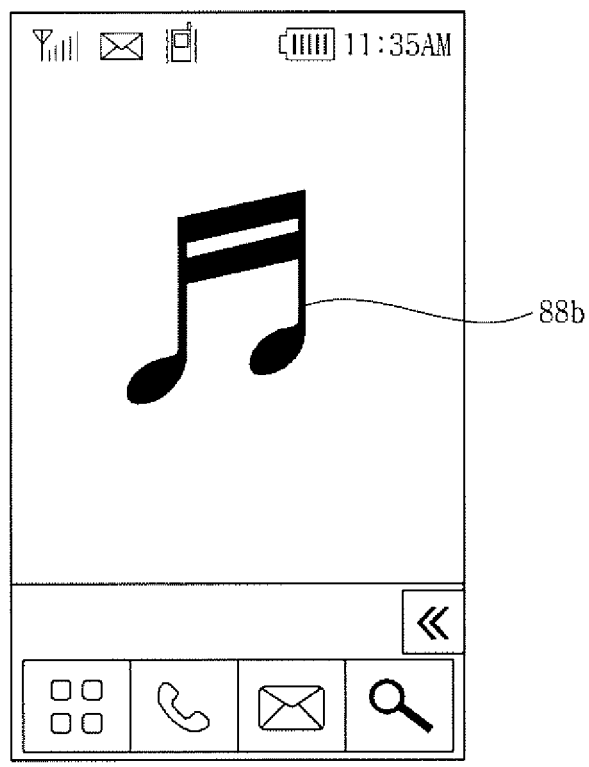
Figure 22C:
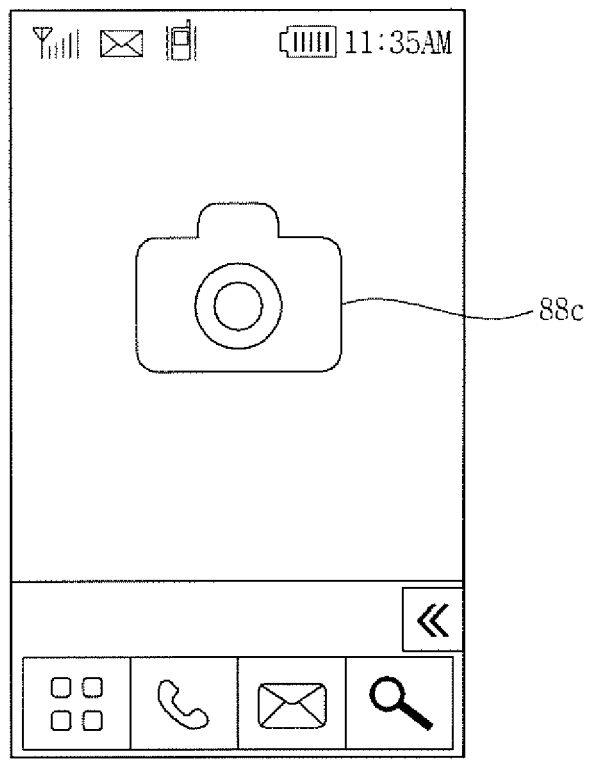

FIGS. 22A to 22C illustrate examples of different types of application icons. FIG. 22A shows an icon 88a representing an application providing a video play function. FIG. 22B shows an icon 88b representing an application providing an audio play function. FIG. 22C shows an icon 88c representing an application providing a camera function. A user will recognize an application (S610) currently set for the screen upon seeing each of the icons 88a, 88b, and 88c shown in FIGS. 22A to 22C. The application icon includes at least one of a text, an icon, an image, and the screen.

Figure 23A:
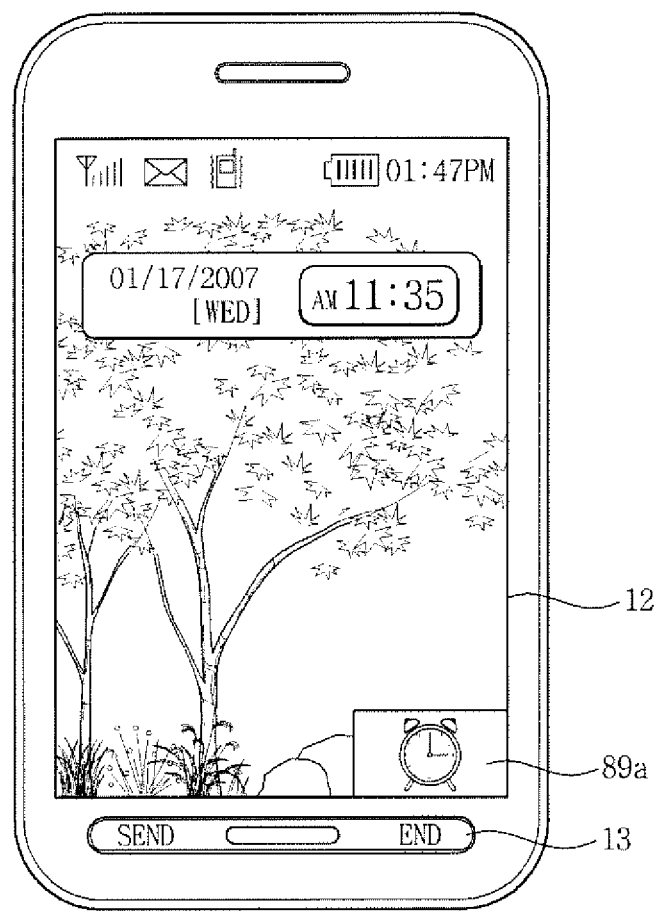
FIG. 23A to 23C are exemplary views of a screen displaying an indicator icon in various formats for a "wake-up" application according to an embodiment of the present invention.
Figure 23B:
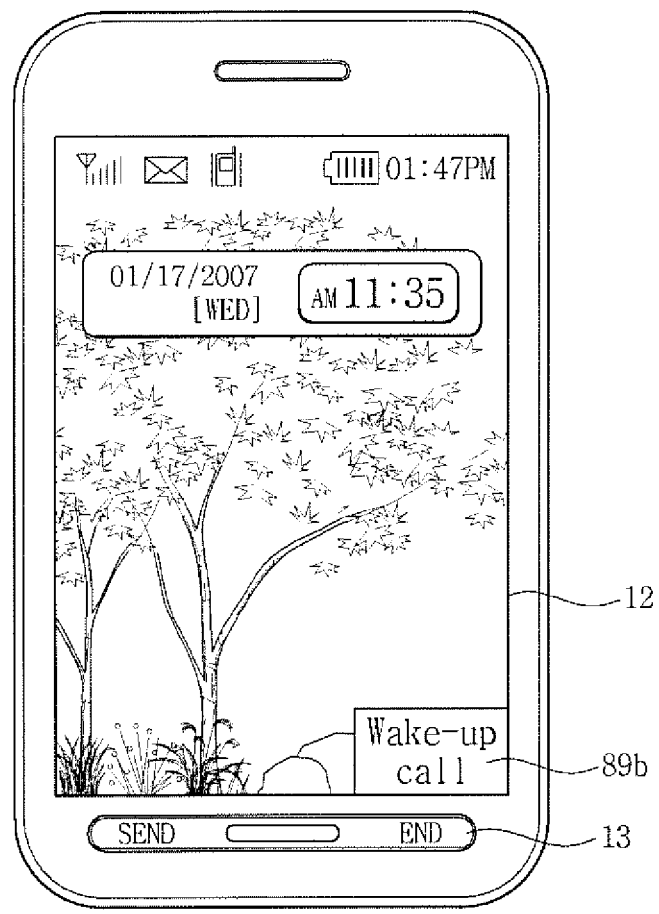
Figure 23C:
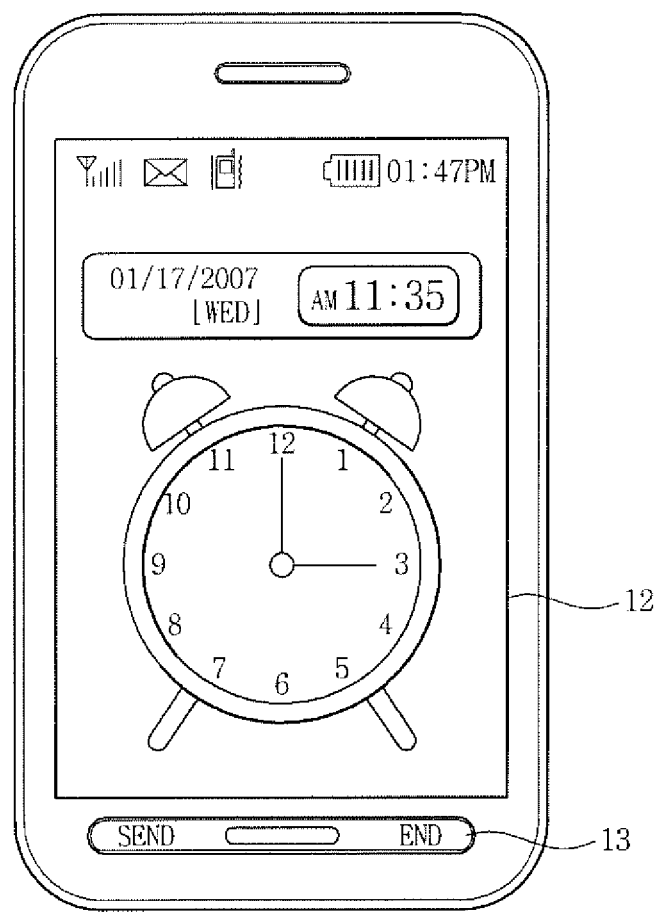

FIGS. 23A to 23C show examples of various types of indicators for a "wake-up call" application. For example, the indicator may be displayed with an icon 89a, text 89b, an image or a screen itself 89c, or a combination thereof.

In the above examples, a screen having one area in the touch input module 12 was described, but these examples are not intended to limit the scope of the present invention.

According to another implementation, a screen displayed in the touch input module 12 may be divided into a plurality of areas.

Figure 24A:
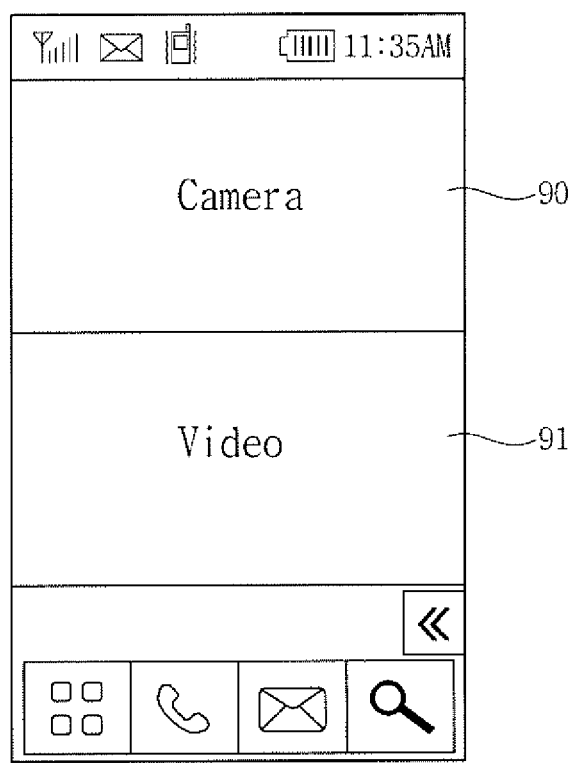
FIG. 24A to 24C are exemplary views of a screen of the mobile terminal divided into a plurality of areas according to an embodiment of the present invention.
Figure 24B:
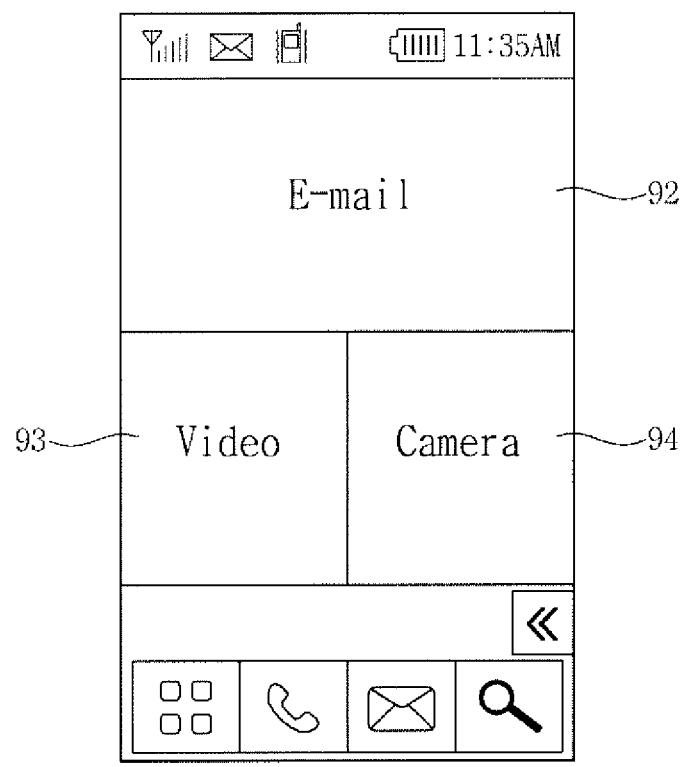
Figure 24C:
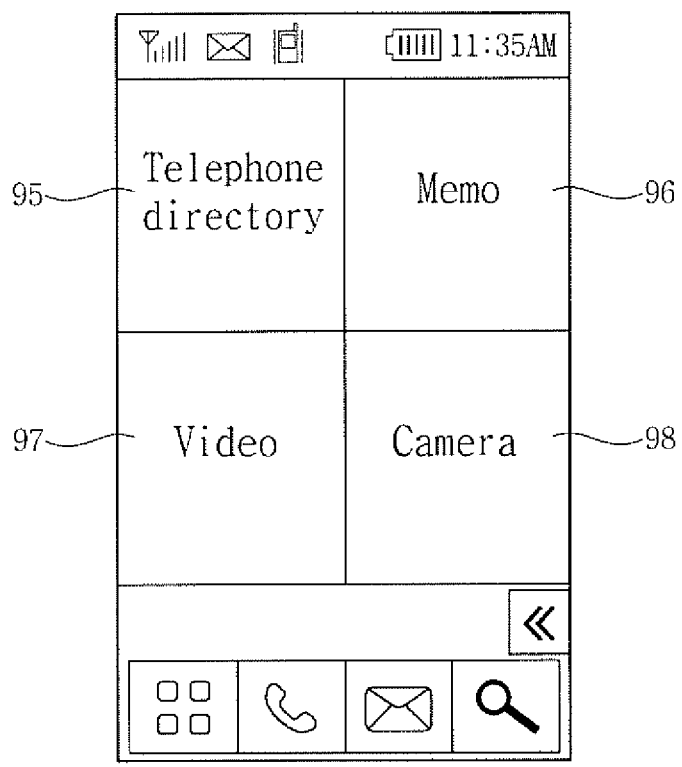

FIGS. 24A to 24C show examples of screens divided into a plurality of areas. Specifically, FIGS. 24A to 24C show examples of screens divided into two areas, three areas, and four areas, respectively.

The plurality of divided areas is linked to different applications. Thus, if a specific area is touched among the plurality of the divided areas in step S600, a specific application linked to the touched specific area is executed in step S610. Information related to the relationship between each area and each application may be stored in the memory 11.

The words "Camera", "Video", "E-mail", "Telephone directory", "Memo", and "MP3" are not characters actually displayed in the touch input module 12, but represent that applications related to them are assigned to the respective corresponding areas. For example, the word "Camera" represents an application providing a camera function, the word "Video" represents a broadcast application or an application providing a moving picture play function, and the word "E-mail" represents an application providing an electronic mail transmission/reception function. Also, the words "Telephone directory" represents an application providing a function of searching or storing a telephone number, the word "Memo" represents an application providing a function of writing a short memo, and the word "MP3" represents an application providing an audio play function.

In FIG. 24A, if a user touches a first area 90, the controller 14 executes the application for the camera function. In FIG. 24B, if the user touches a second area 93, the controller 14 executes the application for the moving picture play function. In FIG. 24C, if the user touches a third area 95, the controller 14 controls to proceed into a menu related to a telephone directory.

The number of the divided areas and the specific application (S610) linked to each of the divided areas may be set and changed by the user. Another implementation of the electronic device 100 may provide a menu for setting an item related to an area of the divided screen.

The electronic device having the touch input module and the information inputting method using the same have several advantages.

First, a new function, as described above, may be assigned to a screen using a device with the touch input module.

Second, a user may input information to the screen by hand writing, thereby easily and conveniently proceeding into an application that is desired or frequently used by the user.

Third, image, music, and moving picture files are played while information such as written memo may be stored in association with the played file.

Fourth, the user may easily and conveniently execute an application that is desired or frequently used by the user by directly touching an icon on the screen.

Fifth, the user may easily and conveniently execute different applications most frequently used according to time zones by placing and touching icons representing the different applications for different time zones on the screen.

Sixth, the user may easily and conveniently execute various applications depending on the number of times a screen is touched or the number of concurrent points that are touched using a device having the touch input module.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method for controlling an electronic device, the method comprising:
    storing a plurality of application in a memory of the electronic device;
    receiving a handwriting input for inputting information via a touch input module of the electronic device;
    displaying a list of applications on the touch input module;
    receiving an input for selecting a specific application of the applications displayed in the list;
    executing the specific application in response to selecting the specific application from the list;
    displaying the inputting information from the handwriting input a screen related to the executed specific application.

2. The method of claim 1, wherein the handwriting input comprises at least one symbol or character, the character comprising a number.

3. The method of claim 1, further comprising:
recognizing the handwriting input by processing the input information in response to selecting the specific application from the list; and
displaying the recognized handwriting input on the touch input module,
wherein the recognized handwriting input is displayed as the handwriting input is being received.

4. The method of claim 1, wherein the specific application comprises at least one of a memo application for storing the input information as a memo, a transmission application for transmitting a message including the input information, a scheduler application for storing the input information as a schedule, a search application for utilizing the input information as a search term, a map application for search a location corresponding to the input information or an application related to a call function.

5. The method of claim 1, wherein the screen related to the executed specific application is displayed on a popup window that is displayed on the touch input module.

6. An electronic device comprising:
a touch input module configured to display information and to receive a touch input;
a memory configured to store a plurality of applications; and
a controller configured to:
receive a handwriting input for inputting information on the touch input module;
display a list of applications on the touch input module;
receive an input for selecting a specific application of the applications displayed in the list;
execute the specific application in response to selecting the specific application from the list; and
display the inputting information from the handwriting input a screen related to the executed specific application.

7. The electronic device of claim 6, wherein the handwriting input comprises at least one symbol or character, the character comprising a number, and
the controller is further configured to recognize the handwriting input using a symbol and character recognition algorithm before executing the specific application.

8. The electronic device of claim 7, wherein the controller is further configured to display the recognized handwriting input on the touch input module.

9. The electronic device of claim 8, wherein the recognized handwriting input is displayed as the handwriting input is being received.

10. The electronic device of claim 6, wherein the specific application comprises at least one of a memo application for storing the input information as a memo, a transmission application for transmitting a message including the input information, a scheduler application for storing the input information as a schedule, a search application for utilizing the input information as a search term, a map application for search a location corresponding to the input information or an application related to a call function.

11. The electronic device of claim 6, wherein the controller is further configured to:
cause the touch input module to display a memo list comprising a plurality of images, one of the plurality of images corresponding to the stored memo and the background screen.

12. The electronic device of claim 6, wherein the screen related to the executed specific application is displayed on a popup window that is displayed on the touch input module.

13. The electronic device of claim 6, wherein the controller is further configured to convert the handwriting input into the inputting information when the specific application is executed, and display the converted inputting information on the screen related to the executed specific application.

14. The electronic device of claim 6, wherein application included in the list is capable of converting the handwriting input into the inputting information.

15. The method of claim 1, further comprising,
converting the handwriting input into the inputting information when the specific application is executed, and
displaying the converted inputting information on the screen related to the executed specific application.

16. The method of claim 1, wherein application included in the list is capable of converting the handwriting input into the inputting information.

17. An electronic device comprising:
a touchscreen; and
a controller configured to:
cause the touchscreen to display a trace of a handwritten input received at the touchscreen;
cause the touchscreen to display a list of applications; and
cause the touchscreen to display a screen associated with an executing first application of the applications in response to receiving a selection of the first application from the list of the applications, wherein the screen includes information converted from the handwritten input.

18. The electronic device of claim 17, wherein the trace is displayed in real-time.

19. The electronic device of claim 17, wherein the handwritten input is received via either a stylus or a user's finger.

20. The electronic device of claim 17, wherein the handwritten input represents one or more of a character, a symbol, or a number.

21. The electronic device of claim 17, wherein the list of applications include icons that are individually associated with an application.

22. The electronic device of claim 17, wherein a number of applications that form the list varies based upon content of the handwritten input.

23. The electronic device of claim 17, wherein the selection of the first application is in response to a touch input received at the touchscreen at a displayed location of the first application.

24. The electronic device of claim 17, wherein the controller is further configured to:
execute the first application in response to receiving the selection of the first application from the list of the applications.

25. The electronic device of claim 17, wherein the converting from the handwritten input utilizes an algorithm.

26. The electronic device of claim 17, wherein the information of the screen comprises text displayed in a non-handwritten format.

27. The electronic device of claim 17, wherein the handwritten input comprises at least one symbol or character, the character comprising a number, and
the controller is further configured to recognize the handwritten input using a symbol and character recognition algorithm before executing the first application.

28. The electronic device of claim 17, wherein the first application comprises at least one of a memo application for storing the information converted from the handwritten input as a memo, a transmission application for transmitting a message including the information converted from the handwritten input, a scheduler application for storing the information converted from the handwritten input as a schedule, a search application for utilizing the information converted from the handwritten input as a search term, a map application for searching a location corresponding to the information converted from the handwritten input, or an application related to a call function.

* * * * *